Oct. 16, 1951 G. S. P. SCANTLEBURY 2,571,296
PULSE-CONTROLLED OSCILLATOR
Filed Sept. 11, 1945
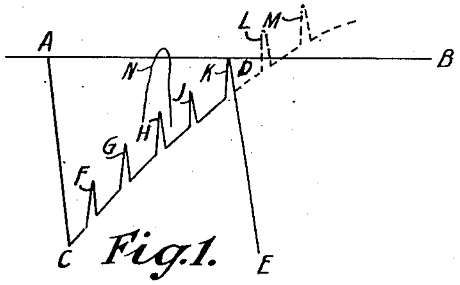
Fig.1.
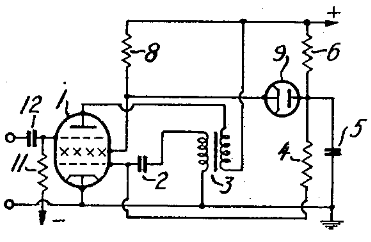
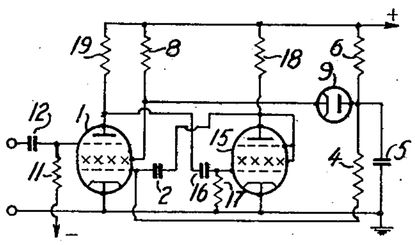
Fig. 2a. Fig. 2b.
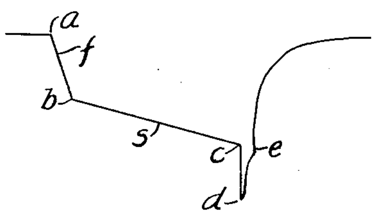
Fig. 3.
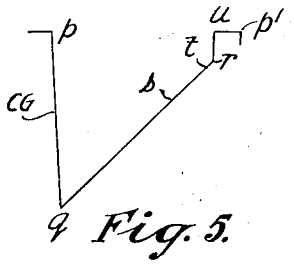
Fig. 5.
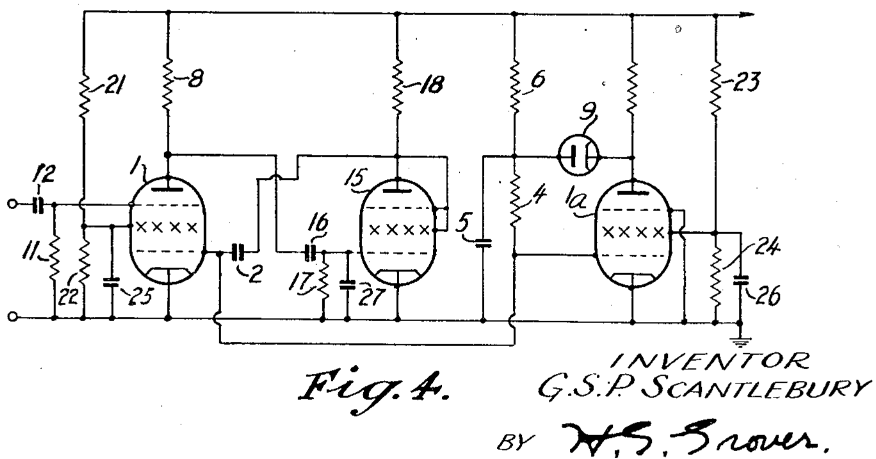
Fig. 4.
INVENTOR
G.S.P. SCANTLEBURY
BY H. S. Grover.
ATTORNEY Patented Oct. 16, 1951

2,571,296

UNITED STATES PATENT OFFICE 2,571,296

PULSE-CONTROLLED OSCILLATOR

Gordon Sidney Pengelly Scantlebury, Ealing, London, England., assignor to Electric & Musical Industries Limited, Hayes, England, a company of Great Britain Application September 11, 1945, Serial No. 615,537
In Great Britain September 20, 1944

3 Claims. (Cl. 250—36)

This invention relates to relaxation oscillation generators for operating under the control of applied impulses. The invention is concerned with relaxation oscillators of the kind having a regenerative loop circuit which is caused to become regenerative at intervals to generate relaxation oscillations.

A relaxation oscillator has the advantage of being readily controlled and is eminently suited for control by synchronising (sync) signals available, for example, in tele-communication systems such as telegraph and television systems. However, unless precautions are taken a relaxation oscillator is susceptible to premature operation by disturbances of an impulsive character which may be mixed with the control impulses or may be developed in the circuit of the oscillator. For example, Figure 1 of the drawings indicates the variation of potential with time during an operating cycle on the control electrode of an electron discharge valve employed in a typical relaxation oscillator circuit. In Figure 1 the line AB is an axis of reference and indicates a level of potential such that if the potential on the control electrode attains this level the oscillator will be caused to relax. The full line curve ACDE represents the potential variation occurring on the control electrode. The portion AC shows a steep fall in the potential of the control electrode which occurs following the triggering of the oscillator whereby the control electrode becomes biassed negatively so as to cause the valve to become non-conductive. The portion CD of the curve shows the gradual recovery of the potential on the control electrode under the control of a suitable time constant circuit such as a resistance-capacity circuit. This recovery usually conforms to an exponential characteristic. Following the recovery the oscillator is again in a condition to be triggered and on being triggered the potential on the control electrode falls as indicated by the portion DE which corresponds to the portion AC. For controlling the oscillator control impulses may be applied to the control electrode of the valve causing potential variations as indicated at F, G, H, J and K in Figure 1.

In the case shown the valve of the oscillator is arranged so that the control electrode potential is brought to the level AB on every fifth impulse such as the impulse K in Fig. 1, the oscillator thus operating to produce oscillations having a frequency one-fifth that of the control impulses. It will be seen from the curve that the mode of operation of the oscillator makes it eminently suitable for use as a frequency divider and to secure the desired frequency of operation in respect of the control impulses it is only necessary to adjust the amplitude of the oscillation so that the oscillator is caused to trigger when an appropriate control impulse is applied to the control electrode of the valve. However, the arrangement has certain objectionable features, for example, if a noise impulse of large amplitude is applied to the control electrode as indicated at N in Figure 1, or if a disturbance of an impulsive character occurs due to some irregularity in the operation of the oscillator which corresponds to a shift of the level AB, the oscillator may be caused to trigger and terminate its oscillatory cycle prematurely.

One of the objects of the present invention is to provide an improved relaxation oscillator with a view to avoiding or reducing the above-mentioned defects.

According, therefore, to one feature of the invention there is provided a relaxation oscillator including a regenerative loop circuit, said loop circuit being permitted at intervals to be regenerative so as to cause the generation of relaxation oscillations, wherein means are provided at one point in said loop circuit for causing said oscillations to control the regeneration in said loop circuit and further means are provided at another point in said loop circuit for normally preventing said loop circuit from becoming regenerative except when a control impulse is present, the arrangement being such that during the period of said relaxation oscillations there is only a short interval during which control impulses can cause said loop circuit to be regenerative whereby the generation of said oscillations is less likely to be disturbed by the presence of undesired impulses.

In addition to the above-mentioned defects it may be that the control impulses become speeded up and in this case the known form of oscillator might not respond to the desired impulse such as the impulse K owing to the fact that the control electrode potential had not attained a sufficiently high value before the arrival of the control impulse. In this case the oscillator would be operated by a later impulse such as the impulse L or the impulse M indicated in dotted lines in Figure 1, and the frequency division effected by the oscillator would be incorrect. Likewise, if the control impulses were slowed down so that their period increased, the control electrode of the oscillator valve might acquire such a potential before arrival of an impulse preceding the impulse K that it would be triggered by the earlier impulse, for example, such as that shown at J in Figure 1.

A further object of the present invention is to provide a relaxation oscillator in which the operation of the oscillator becomes adjusted automatically to the period of the control impulses.

According therefore to a further feature of the invention, there is provided a relaxation oscillator including a regenerative loop circuit, said loop circuit being caused, under the control of control impulses, to become regenerative so as to cause the generation of relaxation oscillations, wherein means are provided for causing said oscillations to control the regeneration in said loop circuit and further means are provided for setting up an additional control for modifying the control exercised by said oscillations, said additional control varying with changes in the repetition period of said control impulses so that if said repetition period varies slowly the generator adjusts itself in accordance with the slow variations in said repetition period whereby said relaxation oscillations are generated in desired synchronism despite said slow changes in said repetition period.

In order that the said invention may be clearly understood and readily carried into effect, it will now be described with reference to Figures 2*a*, 2*b*, 3, 4 and 5 of the drawings, in which:

Figures 2*a*, 2*b* and 4 are each circuit diagrams of arrangements embodying the invention, and Figures 3 and 5 are explanatory graphs referred to in describing the operation of the arrangements shown in the other figures.

In Figures 2*a*, 2*b* and 4 of the drawings, corresponding elements are indicated by the same reference characters.

The arrangement shown in Figure 2*a* comprises an electron discharge valve 1, this valve being a pentode and having a cathode, control electrode, screen electrode, suppressor electrode and anode. The suppressor electrode of valve 1 is employed as a second control electrode.

Connected to the first control electrode of the valve 1 is a time constant circuit comprising a condenser 2 which is connected between the control electrode and the secondary winding of a transformer 3, and a resistance 4. The resistance 4 is connected between the control electrode and a condenser 5 which is arranged to be charged through a resistance 6 from a high tension source indicated by the + sign at the top right-hand corner of the figure.

The screen electrode of valve 1 is connected to the high tension source through a loading resistance 8 and is also connected through a unilaterally conducting device 9 shown as a diode to the junction point of resistances 4 and 6, the diode 9 being arranged to pass current when the screen electrode is negative with respect to said junction point. The suppressor electrode of the valve 1 is arranged to have a negative bias applied to it through a biassing resistance 11 and to have positive control impulses applied to it through a coupling condenser 12 for controlling the operation of the oscillator.

The anode of valve 1 is connected to the positive pole of the high tension source through the primary winding of transformer 3.

As above indicated, the suppressor electrode of valve 1 is negatively biassed. This serves to cut off all anode current except when the electrode is rendered positive by a control impulse. Preferably, the valve is of a type which requires only a small suppressor cut-off potential. The positive control impulses applied to the suppressor electrode cause the suppressor electrode to acquire a potential such that current flow to the anode is permitted if the potential of the control electrode is also such as to permit the flow of anode current. If the amplitude of any impulse applied to the suppressor electrode of valve 1 is excessive the suppressor electrode itself takes current and, due to the limiting action of resistance 11, the excessive amplitude of the applied impulse has little effect on the anode current flow in the valve.

The transformer 3 serves as a phase-reversing device and when anode current flows in the valve this flow results in the application of a charging potential to condenser 2 through the transformer which causes the condenser to become charged due to grid current flow in the valve 1, the length of time for which the condenser charges being dependent upon the design of the transformer. The period necessary for condenser 2 to become fully charged is made shorter than the duration of a control impulse applied to the suppressor electrode of valve 1, so that the charge acquired by the condenser is not affected by the duration of the control impulse.

Due to the charge acquired by the condenser 2 the potential of the control electrode of valve 1 becomes highly negative at the end of the relaxation period and the valve will no longer respond to the positive potential existing on the suppressor electrode due to the presence of a control impulse. When the control impulse ceases the suppressor electrode of valve 1 again becomes negative. The charge on condenser 2 leaks away at a rate dependent on the value of resistance 4 and the potential developed across condenser 5 which is charged from the high tension source through the resistance 6. Preferably the time constant of resistance 6 and condenser 5 is made large compared with the time constant of resistance 4 and condenser 2 so that the rate of discharge of condenser 2 is mainly governed by the time constant of condenser 2 and resistance 4.

After a time the charge on condenser 2 will have leaked away sufficiently for the potential of the control electrode of valve 1 to be high enough to permit current to flow in the valve. Thus, screen current flows in the valve causing a potential drop across resistance 8 which will drive the screen sufficiently negative to cause diode 9 to take current from condenser 5. After the elapse of a further time the potential of the control electrode will have risen to an extent such that upon the application of a control impulse of sufficient amplitude to the suppressor electrode of the valve, anode current will be caused to flow in the valve and by virtue of the back coupling between the anode and control electrodes of the valve the condenser 2 again becomes negatively charged thus completing the cycle of oscillation. The valve 1 is thus arranged in a loop circuit which is prevented from becoming regenerative by controls exercised at two points therein. One of said points is the control electrode of valve 1, which exercises a control due to the potential acquired by condenser 2 when oscillations are generated and the other point is the suppressor electrode of valve 1 which is negatively biassed. As a result of the control of the loop circuit at two points therein, triggering of the oscillator by spurious impulses is substantially prevented as will hereinafter be described.

The curve S of Figure 3 shows the variation of the potential of the screen electrode of the valve 1 with time during a cycle of oscillation of the valve. Immediately after current in the valve has been cut off the potential of the screen electrode will be that of the high tension source. However, at a time indicated by the point *a* the potential of the control electrode of the valve 1 rises sufficiently to permit the flow of screen current and the potential of the screen electrode then falls relatively rapidly as indicated by the portion *ab* of the curve up to the point when the diode 9 begins to conduct. After this point, however, the potential of the screen falls less rapidly as represented by the portion *bc* of the curve and at point *c* a control impulse is applied to the suppressor electrode of the valve causing a sharp pulse of anode current in the valve and also of screen current so that the potential of the screen electrode falls sharply as indicated by the portion *cd* of the curve. It then recovers rapidly as shown by the portion *de* of the curve till at a time represented by the point *e* the valve 1 cuts off due to the collapse of voltage across the secondary winding of transformer 3. At this point the condenser 2 is charged negatively and thereafter the screen potential attains its initial value more or less gradually, the rate of recovery depending on the stray capacities associated with the screen electrode.

The valve 1 is susceptible to operation by an impulse applied to the suppressor electrode of the valve from a time represented by the point *f* in Figure 3 between the points *a* and *b* to the time represented by point *c* in Figure 3, impulses applied to the suppressor electrode prior to the instant indicated by the point *f* being unable to cause the gain of the valve to become high enough for the loop circuit to become regenerative. Accordingly the valve can only be triggered by pulses arriving in the interval *fc* which is termed the "vulnerable period." The vulnerable period is the only period during which the valve can be triggered by impulses applied to the suppressor electrode and false operation by pulses arriving outside this interval is prevented. By suitably choosing the time constant of the resistance capacity combination 4, 2, the vulnerable period can be made a very small proportion of the total period of a cycle so that the oscillator is only susceptible to control by the control impulses for a very small part of its period. Thus the chance of early false operation of the oscillator is reduced. Moreover, the operation of the oscillator is not sensitive in any way to the amplitude of the control impulses, since all pulses occurring outside the vulnerable period are ignored and an increase of control-pulse amplitude cannot therefore cause triggering of the oscillator by a pulse prior to that normally causing triggering. Amplitude variations of the control impulses above a certain operational minimum may cause current to flow in the suppressor electrode, the result of which would only be to alter the mean bias of the suppressor electrode and to load the signal source. On account of the self-biassing of the suppressor electrode with large amplitude pulses it is advantageous to employ large amplitude pulses for control, since the larger the control impulses the less likely it becomes that noise impulses will be incident of the same order of amplitude, and because, moreover, those of amplitude less than this order will be ineffective to cause false triggering of the oscillator in the vulnerable period by reason that they cannot offset the effect of the large mean bias that results with large amplitude control pulses. Thus, the employment of large amplitude control impulses reduces the chance of false operation during the vulnerable period.

The arrangement of Figure 2*a* also operates so as to avoid difficulties arising from the employment of control impulses which are subject to changes of period, for example, by reason of being locked to a mains supply or other master source which is itself locked to a standard subject to errors. If the period of the control impulses should change slowly, provided the time constant of the resistance 6 and capacity 5 is short enough to follow the changes in period of the control impulses by which the valve 1 is caused to trigger, it is not neecssary to increase the vulnerable period in each cycle to allow for the variations in period of the control impulses, because the oscillator adapts itself to the changing period.

It will be seen that if the control impulse is late in arriving at the suppressor electrode of valve 1, the triggering of the valve will be delayed and consequently the portion *bc* of the curve S of Figure 3 will be longer. It will thus be realised that the diode 9 connected between the junction of resistances 4 and 6 and the screen electrode of valve 1 will pass current for an interval which is increased in accordance with the delay in arrival of the control impulse. Accordingly, when the control impulse is delayed, the condenser 5 is discharged through the diode 9 to a greater extent than what it is if the control impulse arrives at the correct time so that when the control impulse is delayed the junction of resistances 4 and 6 is brought to a lower potential than it otherwise would be. Consequently the potential of the control electrode of valve 1 takes a longer time to recover to values such that the flow of screen current is permitted and such that the valve can be triggered by an impulse applied to the suppressor electrode respectively. Thus the start of the vulnerable period represented by the point *f* in Figure 3 is delayed to correspond with the lengthened period of the control impulses.

Likewise, should the control impulses be speeded up so that their period is reduced, the interval during which the diode 9 is conducting will be reduced and the condenser 5 will be discharged to a lesser extent through the valve 1. Accordingly, when the valve 1 is rendered non-conducting following the regeneration that ensues upon the application of a control impulse, the junction point of resistances 4 and 6 will be at a higher potential than if the period of the control impulses was unchanged. In consequence the potential of the control electrode of valve 1 will recover more rapidly to values such that the flow of screen current in the valve and the triggering of the valve by impulses applied to the suppressor grid respectively is permitted. Thus, the commencement of the vulnerable period will be advanced to correspond with the reduction in the period of the control impulses.

The additional control exercised as a result of the charging or discharging of condenser 5 may be regarded as a means for automatically adjusting the effective time constant of the resistance 4 and the capacity 2 to follow variations in the period of the control impulses.

The arrangement described is not only satisfactory for avoiding synchronising difficulties due to variation in the period and amplitude of control impulses applied to the suppressor electrode of valve 1, but it is also insensitive to changes in the circuit conditions, since if, for example, variations in the valve characteristic occur, these cause variations in the biassing of the valve due to the changes in the screen current flow to compensate for the changed characteristics of the valve.

It will be appreciated that in the arrangement of Figure 2*a* the transformer 3 may be replaced by any other suitable phase-reversing device and in Figure 2*b* an arrangement is shown in which a valve 15 is employed as a phase-reversing device, this valve being shown as a pentode similar to the valve 1 but connected as a triode and having its screen electrode, suppressor electrode and anode connected through the condenser 2 to the control electrode of valve 1 and its control electrode connected through a condenser 16 to the anode of valve 1 and having a grid leak resistance 17 and an anode load 18. An anode loading resistance 19 is also provided for the valve 1. It will be seen that the circuit arrangement of Figure 2*b* is that of a multi-vibrator. The pulse-width ratio of the pulses developed by valves 1 and 15 may be of the order of 100: 1.

A preferred form of the invention is shown in Figure 4 of the drawings, the arrangement shown in this figure being similar to that shown in Figure 2*b* but being provided with a valve 1*a* for passing the discharge current fed through the rectifier 9. The valve 1*a* is shown as a pentode similar to the valve 1. Screen potential for the valve 1 is derived from a potentiometer comprising resistances 21 and 22 and screen potential for the valve 1*a* is derived from a potentiometer comprising the resistances 23 and 24, the resistances 22 and 24 being shunted by de-coupling condensers 25 and 26 respectively. Also in Figure 4 the control electrode of valve 15 has a condenser 27 in shunt with resistance 17 in its input circuit. It will be seen that the diode 9 is connected to the anode of valve 1*a* and not to the screen electrode thereof so that the current in diode 9 flows between the cathode and anode of valve 1*a* and not through the screen thereof, diode 9 becoming conductive when the anode of valve 1*a* becomes sufficiently negative. The valve 1*a* has the same potential applied to its control electrode as the valve 1, but it is arranged that the screen potential of the valve 1*a* is higher than that of the valve 1. This permits the time at which the diode 9 passes current, represented by the point *b* in Figure 3, to occur before the valve 1 becomes vulnerable and makes it possible to reduce the vulnerable period of the valve 1 without reducing the time for which diode 9 passes current. This gives a closer control of the vulnerable period since, with a short vulnerable period, the discharge of condenser 5 is steadier than in the simpler circuits of Figures 2*a* and 2*b*. For the latter circuits, if the vulnerable period is short, the time for which diode 9 conducts is also short and most of the discharge of the condenser 5 may be effected during the re-setting operation initiated by the control impulse and represented by the portion *cde* of the curve S of Figure 3.

The arrangement of Figure 4 leads to a more satisfactory operation of the valve 1 and allows a closer regulation of the voltage developed across the condenser 5.

Curve CG of Figure 5 shows the approximate waveform of the potential applied to the control electrodes of valves 1 and 1*a* of Figure 4. This waveform comprises a very steep portion *pq* following the triggering of the valve during which the potential of the control electrodes becomes highly negative so as to shut both valves off. The potential then becomes increasingly positive over the portion *qr*, at a rate dependent on the time constant circuit 2, 4, the effective time constant of which is controlled automatically in accordance with the length of time for which diode 9 passes current in the manner described above and in connection with the arrangement of Figure 2*a*. As the potential of the control electrode rises the valve 1*a* begins to pass current at a point indicated by S in Figure 5 and at a further point *t* the potential of the control electrode of valve 1 attains a value such that the valve 1 can be triggered by control impulses applied to its suppressor electrode, that is to say at point *t* the vulnerable period of the circuit commences. At the instant represented by the point *r* in Figure 5, the valve 1 is triggered and the loop circuit becomes regenerative, whereupon a positive pulse *up'* appears on the control electrode of the valve. With the termination of the regenerative cycle, which is preferably arranged to occur before the termination of the control impulse, the potential of the control electrode falls corresponding to the fall represented by the portion *pq* of the curve. It will be seen that the vulnerable period of the arrangement is confined to the very short interval *tr*.

Another advantage of the circuit shown in Figure 4 is its greater immunity from an occasional false triggering due to interference occurring during the vulnerable period. It will be appreciated from Figure 3 that should an interference pulse occur on the suppressor electrode of valve 1 during the vulnerable period and before the desired control impulse, and should the interference pulse cause the valve to trigger, the time for which condenser 5 discharges will be shorter than would otherwise be the case and the effective time constant of the circuit 2, 4, will be shortened. Thus, during the following cycle the vulnerable period will start earlier, not only due to the fact that the interference pulse was earlier than the desired control impulse, but also due to the automatic adjustment of the effective time constant of the circuit 2, 4, which has occurred. This may cause the time of operation of the oscillator to become so advanced that where the oscillator is operating as a frequency divider it becomes locked to impulses occurring earlier than the desired control impulse and the frequency division is thereby made incorrect. If, of course, the circuit does not become incorrectly locked in this manner, it will be understood that the effective time constant 2, 4, will become readjusted to its correct value as the circuit continues to be operated by the desired control impulse in the absence of further interference. In the circuit of Figure 4, however, the whole vulnerable period can be made such a small part of the period during which the diode 9 is discharging that any variation of the vulnerable period due to premature firing by an interference pulse produces such a small change in the effective time constant 2, 4, that the oscillator cannot be disturbed sufficiently to lock-in to a control impulse occurring in advance of the desired control impulses.

In a particular case an oscillator was constructed in accordance with the circuit of Figure 4 and was operated with equal square pulses of 15 volts double amplitude and of 30 micro-seconds period as control impulses. The re-setting period corresponding to the period *rup* of Figure 5 was just under 15 micro-seconds. The total period of the oscillator was approximately 2220 micro-seconds, that is to say, the circuit was dividing by 74 so that the vulnerable period during each cycle corresponding to the time represented by *tr* in Figure 5 must have been less than 15 micro-seconds giving a ratio of the vulnerable period to the oscillator period better than 15:2220 or 1:148. Changes in amplitude of the control impulses above an operational minimum were found to have no observable effect on the oscillator and also when the period of the control impulses was lengthened it was found that the oscillator continued to be triggered by every 74th control impulse even when the total period had become increased by 60 micro-seconds.

The invention is applicable to oscillation generators employed as frequency dividers, as counters or as generators of saw-tooth oscillations such as are employed in television apparatus and time bases and synchronised by synchronising impulses.

What I claim is:

1. A triggerable relaxation oscillator comprising in combination an amplifier having at least a cathode, a grid and a plate, a polarity reversing circuit connected to said plate, a first condenser connected between said polarity reversing circuit and said grid, a second condenser and a resistor connected in series with said first condenser and at least a portion of said polarity reversing circuit so as to form a closed loop, said resistor being connected to said grid, said cathode being coupled to a point in said loop intermediate said polarity reverser and said second condenser, a first source of fixed potential connected in series with said second condenser so as to tend to charge it to a given potential, a unilateral current conducting device having a plate and a cathode, its plate being connected to the junction of said resistor and said second condenser, a second source of potential, and means connected to the cathode of said unilateral device and said second source of potential for decreasing the potential of the cathode of said unilateral device in response to an increase in potential of said grid.

2. A triggerable relaxation oscillator comprising in combination an amplifier having at least a cathode, a grid and a plate, a first condenser connected to said grid, a polarity reversing circuit connected between said condenser and said plate, a resistance and a second condenser coupled in series in the order named between said grid and said cathode, a source of fixed potential coupled to said second condenser so as to tend to charge it to a predetermined potential, a unilateral current conducting device having a plate and a cathode, the plate of said unilateral device being connected to a point between said resistance and said second condenser, a second source of potential, and means connected to the cathode of said unilateral device and said second source of potential for decreasing the potential of the cathode of said unilateral device in response to an increase in potential of said grid.

3. A relaxation oscillator comprising in combination a first amplifier having at least a plate, a grid and a cathode, a first condenser connected to said grid, a polarity reversing circuit connected between said plate and said condenser, a second amplifier having at least a plate, a grid and a cathode, said cathodes being coupled together, and said grids being coupled together, a resistor and a second condenser coupled in series in the order named between said grids and said cathodes, a unilateral current conducting device having a plate and a cathode, said latter cathode being coupled to the plate of said second amplifier and said latter plate being connected to a point between said second condenser and said resistor.

GORDON SIDNEY PENGELLY SCANTLEBURY.

REFERENCES CITED

The following references are of record in the file of this patent:

UNITED STATES PATENTS

| Number | Name | Date |
|---|---|---|
| 2,125,732 | Bowman-Manifold et al. | Aug. 2, 1938 |
| 2,143,366 | Andrieu | Jan. 10, 1939 |
| 2,196,825 | Geiger | Apr. 9, 1940 |
| 2,221,665 | Wilson | Nov. 12, 1940 |
| 2,221,666 | Wilson | Nov. 12, 1940 |
| 2,235,131 | Wheeler | Mar. 18, 1941 |
| 2,255,403 | Wheeler | Sept. 9, 1941 |
| 2,277,000 | Bingley | Mar. 17, 1942 |
| 2,297,926 | Usselman | Oct. 6, 1942 |